United States Patent [19]

Jones

[11] 4,423,798

[45] Jan. 3, 1984

[54] LIFT-PAD ASSEMBLY FOR VEHICLE LIFT

[76] Inventor: John A. Jones, 6312 Fairfield Dr., Flourtown, Pa. 19031

[21] Appl. No.: 283,190

[22] Filed: Jul. 14, 1981

[51] Int. Cl.[3] .......................................... B60S 13/00

[52] U.S. Cl. .................................. 187/8.75; 254/2 B

[58] Field of Search .................... 187/8.74, 8.75, 8.71, 187/8.72, 8.57, 8.59, 8.67, 8.45, 8.41, 18; 254/134, 89 R, 2 R, 2 B, ; 182/69, 141

[56] References Cited

U.S. PATENT DOCUMENTS

| | | | |
|---|---|---|---|
| 1,234,759 | 7/1917 | Hensley | 187/8.72 |
| 1,370,002 | 3/1921 | Barrett | 187/8.72 |
| 2,543,260 | 2/1951 | Teegarden | 187/8.75 |
| 3,362,502 | 1/1968 | Clarke | 187/8.72 |

*Primary Examiner*—Joseph J. Rolla
*Assistant Examiner*—Kenneth Noland
*Attorney, Agent, or Firm*—Albert L. Free

[57] ABSTRACT

A lift-pad assembly of adjustable height for use on a swing arm of a vehicle lift comprises a platform for contacting and at least partially supporting an undersurface of the vehicle, the platform being vertically adjustable in position while remaining horizontal by mounting it on the arm by means of pivotable support linkages the pivot axes of which are at the vertices of a parallelogram. Vertical positions for the platform other than fully up or fully down are provided by bars which can be interposed at will between the platform and a lower base support by operation of one or more slideable plates.

5 Claims, 13 Drawing Figures

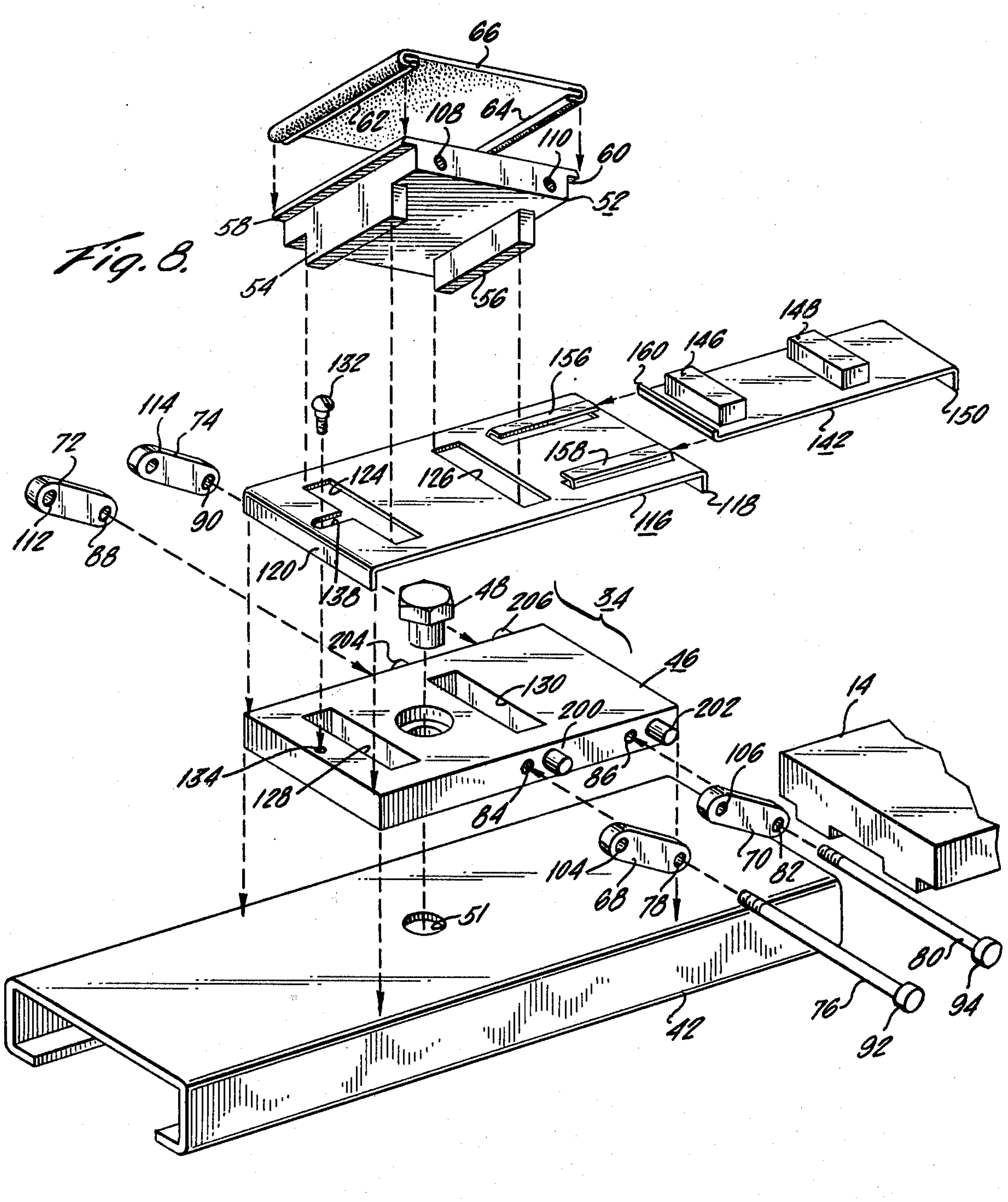
Fig. 8.
Fig. 13.
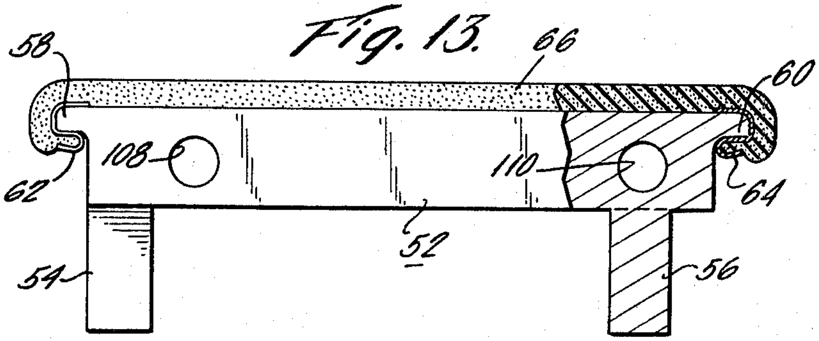

LIFT-PAD ASSEMBLY FOR VEHICLE LIFT

BACKGROUND OF THE INVENTION

Vehicle lifts are known in which a central bolster plate is mounted on top of a vertical hydraulic piston, and horizontally pivotable support arms extend outwardly from the bolster plate. Commonly, lift-pads are located on each of these arms, and are slideably mounted so that the lift-pads can be moved to any appropriate position along the arm, as desired for making contact with the particular vehicle being lifted.

Typically the top of the pad will extend at least somewhat above the level of the swing arm but not enough to interfere with the driving of the vehicle into and away from the lifting position when the hydraulic piston is fully retracted. The lift pad may also have a flat upper surface of substantially area so that it will support the relatively large weight of the vehicle without tending to dent or damage the vehicle surface with which it is in contact.

In some significant applications, it is highly desirable to be able to selectively adjust the height of the top of the lift-pad above the swing arm. One reason for this, in some cases, is to permit adjustments of the relative heights of the tops of the lift-pads on the several swing arms. For example, in a practical lift, and particularly one which has been subjected to long and hard use, the other ends of the swing arms where the lift-pads are located may not all be in exactly the same horizontal plane, and in order to maintain the vehicle exactly straight on the lift, it may be desirable to adjust the heights of one or more of the lift pads with respect to others. It is also possible, in some cases, that the parts of the vehicle against which the lift pads bear are not all in the same horizontal plane, in which case adjustability of the height of the individual lift pads is also desirable. Furthermore, in some cases it may be desirable, or necessary, to support the vehicle on portions thereof which are vertically recessed with respect to parts of the vehicle beneath which the swing arms must extend, which means that it is desirable for the top of the lift pads to extend vertically upwardly from the swing arms to a substantial degree, and to different degrees for different types of vehicles.

Even where the vehicle lift arms are perfectly horizontal and the lift points on the vehicle exactly in the same horizontal plane, lift pads of adjustable height are desirable where contact is to be made at a vertically recessed position on the underside of the vehicle. In most practical cases, it is not possible to make the lift pads permanently of large height, so as to be capable of extending into upwardly recessed portions of the underside of the vehicle, since then they will tend to interfere with the vehicle as it is being driven into or out of position over the vehicle lift.

Lift pads providing some degree of adjustment of height are known in the art. For example, it is known to utilize a lift pad which can be rotated by 90°, about a horizontal axis, from a first position in which it presents a relatively large-area support surface for the vehicle at a relatively low height, and a second position in which a smaller-area top surface extends to a greater height to support the vehicle thereon. A major difficulty with such an arrangement is that the smaller-area edge surface presented to the vehicle when the pad is turned to give maximum height can on occasions result in denting, fracturing or other damaging of the portion of the vehicle against which it bears. This is particularly true in certain very recent types of vehicles in which the bottom of the vehicle is substantially completely enclosed with sheet metal, and the support must be provided on this relatively thin sheet metal undersurface.

Further, the above-described arrangement of the prior art provides only two possible height positions for the lift-pad, whereas in some cases more than two lift-pad heights would be desirable.

Accordingly, it is an object of the present invention to provide a new and useful lift-pad assembly.

Another object is to provide such lift-pad assembly which is readily adjustable in height, yet provides a suitable broad-area contact surface at its top regardless of the height to which it is adjusted.

A further object is to provide such a lift-pad assembly which is easy and inexpensive to make, strong, long-lived, easy to adjust, and does not require use of loose shims or other parts which may be removed from a lift assembly and easily lost or misplaced.

BRIEF SUMMARY OF THE INVENTION

In accordance with the invention, there is provided a lift-pad assembly employing a platform having a selected, desired top surface area, and means for mounting the platform on the vehicle lift arm so that the platform can readily be adjusted to the desired vertical position while maintaining the platform horizontal in each of its adjusted positions. In this way, the desired vertical adjustment is made possible while simultaneously assuring that the top surface area is sufficient to avoid harm to the portion of the vehicle which bears against the platform during the lifting operation.

While the lift pad of the invention may be constructed to have only two vertical positions, it is preferably constructed to provide one or more intermediate vertical positions of adjustment as well.

The apparatus of the invention utilizes pivoted linkages to support the platform on the swing arm, preferably by way of an intermediate slideable sleeve and a base member on the sleeve. The pivot axes for the linkages are preferably at the vertices of a parallelogram; with this arrangement, the platform can be moved in an arc from substantially its highest position, in which the support linkages are near vertical, to its lowermost position, in which it typically rests against the base member, the platform moving sideways and downwards simultaneously along an arc while at all times remaining horizontal. This position in which the platform lies against the base can therefore be used as the lowest adjusted position, and the platform position in which the linkages are substantially vertical can be used as the highest adjusted position; in the latter position, stop means are preferably provided acting between the base member and the linkages to hold the platform at its highest adjusted position, against any tendency for it to be displaced and to fall abruptly to a lower position.

Preferably, one or more other vertically-adjusted positions are provided between the above-described uppermost and lowermost positions. In a preferred embodiment, bar means are provided on the undersurface of the platform, and corresponding recesses are provided in the base member for receiving these bar members to permit lowering of the platform to its desired lowermost position; a slideable plate member is also provided for covering the recesses and supporting the bar means against entry into the recesses when it is desired to adjust the platform to an intermediate position. In order to minimize the amount of motion of the plate required when more than one bar means and corresponding recesses are employed, it is preferred to provide corresponding plural openings through the plate which, when positioned above the recesses, will permit the bar means to move into the recesses and thereby also permit the platform to assume its lowest position, while by a small horizontal sliding of the plate the recesses are covered by the plate to arrest the downward motion of the bar means and hold the platform at the desired intermediate position.

Still another intermediate adjusted height may be provided by means of another slideable plate placed above the first plate and having bar means on and above it, which plate can be aligned with the bar means on the underside of the platform to arrest the downward motion of the platform at a different intermediate position, this plate being slideable away from the described position so that the bar means thereon can be positioned entirely beyond the edge of the platform when it moves downwardly; or, corresponding recesses can be provided in the underside of the platform into which upwardly-extending bar means can be accommodated when properly positioned, so as to permit the desired motion of the platform to one of its lower positions.

In order to retain the bottom slideable plate in position in the apparatus, and to facilitate its alignment and non-alignment with the recesses in the base member, the bottom plate may be provided with appropriate stop members which limit its motion in one direction to that position in which the openings therein are aligned with the recesses in the base member, and a second position in which the recesses are completely covered by the plate. Functionally similar stop members are preferably provided for the top slideable plate, when used.

In a preferred form of the invention, two pairs of supporting linkages are utilized, one pair on each of the two opposite sides of the platform and of the base member, and two spaced-apart bar means are utilized on the bottom side of the platform, with two corresponding appropriately positioned recesses in the base plate. In this case the upwardly extending bar means on the top slideable plate will be spaced apart by substantially the same distance as the bar means on the underside of the platform.

In operation, the platform can be adjusted to its lowermost position before the vehicle is moved into position above the lift, then one or more of the lift-pad assemblies adjusted to the desired height as described above, the hydraulic lift operated to hoist the vehicle, and, when the hydraulic lift returns to its lowered position, the lift-pad assembly can be adjusted to reposition the platform in its lowermost position while the vehicle is removed. All parts of the lift-pad assembly are preferably made of a strong steel.

BRIEF DESCRIPTION OF FIGURES

These and other objects and features of the invention will be more readily understood from a consideration of the following detailed description, taken in connection with the accompanying drawings, in which corresponding parts are designated by corresponding numerals, and in which:

FIG. 8 is an exploded perspective view of a lift-pad assembly according to the invention;

FIG. 13 is an enlarged fragmentary view, partly in section, showing in detail one preferred construction of the platform.

DETAILED DESCRIPTION OF SPECIFIC EMBODIMENTS

Figure 1:
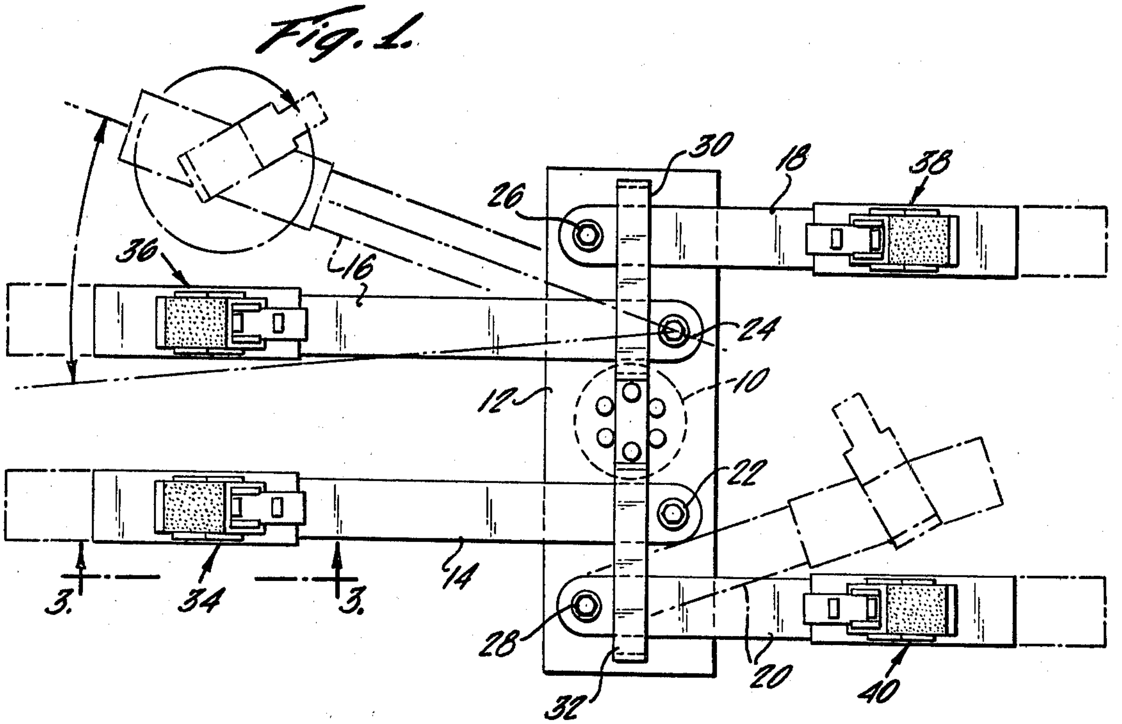
FIG. 1 is a plan view of a vehicle lift system embodying a lift-pad assembly in accordance with the invention.
Figure 2:
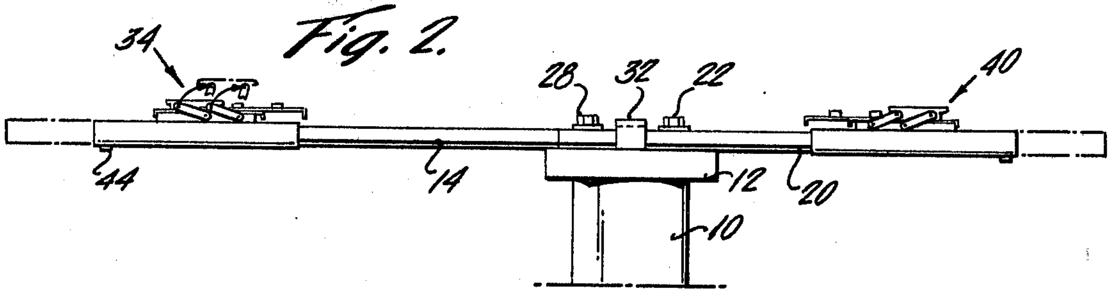
FIG. 2 is a side view of the apparatus of FIG. 1.

Referring first to FIGS. 1 and 2, there is shown a hydraulic lift piston 10 which can be raised and lowered as desired by hydraulic pressure, in conventional manner. On top of the piston is secured a rectangular steel bolster plate 12, to the top of which are pivoted four swing arms 14, 16, 18 and 20, by means of pivot bolts 22, 24, 26 and 28, respectively. The swing arms can be pivoted horizontally, as indicated by the alternate positions for two of the arms shown in broken line. Arms 12 and 16 are bridged by a welded U-shaped bracket 30, while arms 14 and 20 are bridged by a corresponding bracket 32. The portion of the system thus far described may be like that described and claimed in my U.S. Pat. No. 4,114,728, filed Sept. 6, 1977 and issued Sept. 19, 1978, and hence need not be described herein in further detail.

The lift-pad assemblies of the invention are shown at 34, 36, 38 and 40, and since each may be identical with the others, only one will be described in detail.

Referring now to FIGS. 3-13 in which corresponding parts are indicated by corresponding numerals, and assuming that the lift assembly being described in detail is lift assembly 34 on swing arm 14, the swing arm 14 is channeled on its bottom surface to provide easy axial sliding motion of the surrounding sleeve 42 on which the lift-pad of the invention is mounted. The bottom of the outward end of the sleeve 42 is cut away for a portion of its length, and a limit screw 44 screwed into the center of the undersurface of arm 14 so that its head acts as a stop member to prevent the center of sleeve 42 from being slid beyond the end of arm 14.

On the top of sleeve 42, and near its longitudinal center, base support member 46 is mounted by means of a short unthreaded bolt 48 which extends through base member 46 from the top and through the top wall of sleeve 42, where it is held by a weld at the inner end thereof, which weld is preferably ground smooth so as to not protrude within the sleeve to any substantial degree. The bolt 48 within hole 51 in sleeve 42 is loose enough to permit rotation of base member 46 with respect to sleeve 42, to permit orientation of the lift-pad with respect to the sleeve and arm 14, as desired in use.

The platform 52 in this example comprises a single integral rectangular plate of steel having two integral bars 54 and 56 protruding downwardly therefrom. The bars in this example are rectangular in form and spaced well apart to enhance stability when the load is supported by the bars. In this example, peripheral overhangs are provided at the top of the platform at 58 and 60 to accommodate a corresponding pair of spring clips 62 and 64 for securing a removable plastic covering 66 to the top of the platform, facilitating replacement of the plastic covering after damage due to repeated usage.

Platform 52 is supported on base member 46 by a first pair of support linkages 68 and 70 and a second pair of support linkages 72 and 74. Pivot means in the form of pivot pin 76 and pivot bore 78 are provided at the lower end of support linkage 68, and pivot means in the form of pivot pin 80 and pivot bore 82 in the lower end of support linkages 70 are provided to pivotably mount the lower end of the latter support linkage. Pins 76 and 80 extend through parallel bores 84 and 86 in base member 46 and then through pivot bores 88 and 90 in the support linkages 72 and 74 on the opposite side of base member 46. Heads 92 and 94 are provided on the pivot pins close to the surfaces of support linkages 68 and 70, while the opposite ends of the pivot pins adjacent the outer surfaces of support linkages 72 and 74 are secured by means of nuts such as 95, 96 and 97.

Similarly, pivot pins 100 and 102 pass through the upper pivot bores 104 and 106, through bores 108 and 110 in the platform, and then through the pivot bores 112 and 114 in the upper portions of support linkages 72 and 74, thereby to provide pivotable mounting of the platform to the upper ends of the four support linkages.

It will be seen that the pivot axes for all eight pivots of the four support linkages are all parallel to each other, and in fact corresponding pivot axes of the two support linkages on one side of the platform are coaxial with corresponding pivot axes of the support linkages on the opposite side of the platform. Furthermore, the distance between the pivot axes in each support linkages is equal to the distance between the pivot axes in the other three support linkages. In addition, the line joining the lower pivot axes in one pair of support linkages is horizontal and parallel to a line joining the upper pair of pivot axes in the same pair of linkages, and for each support linkage the line joining its upper and lower pivot axes lies in a vertical plane. Accordingly, platform 52 can be moved upwardly or downwardly with respect to the base 46 along an arc, while maintaining its upper surface horizontal, as desired.

The head of bolt 48 is countersunk in base support 46, so that plate 116 may slide back and forth over it for at least a limited distance. Plate 116 is provided with two down-turned flanges 118 and 120 at its opposite ends, and is sufficiently longer than base member 46 that it can be slid forwardly and backwardly enough to align the two rectangular openings 124 and 126 therein with the corresponding rectangular openings 128 and 130, respectively, extending through the base member 46, and can be moved in the opposite direction to misalign the openings in plate 116 with respect to the openings in base member 46; the end flanges 118 and 120 operate as stop members for such motion. As will be presently be described in more detail, alignment of the two pairs of apertures in the bottom plate 116 with the corresponding apertures in the base member 46 permits the platform 52 to be moved downwardly against the top of base member 46 with the bars 54 and 56 extending into the openings 128 and 130 in base member 46; by moving the lower plate 116 to its alternate position in which it covers the latter recesses, the bars 54 and 56, in the lowered position of the platform, will bear against the upper surface of the bottom plate to support the platform in a slightly raised position.

A screw 132 may be inserted into a threaded bore 134 in base member 46, and bottom plate 116 provided with a central axial extension 138 of opening 124, whereby the bottom plate 116 during its sliding motion between its two end positions can move beneath the head of screw 132, yet the latter screw provides a disincentive for operating personnel to remove the bottom plate 116 and perhaps misplace or damage it.

In the present embodiment, there is also provided a further slideable plate 142 having a pair of bars 146, 148 spaced apart on its upper surface. Plate 142 is adapted to slide over the top of plate 116 between a forward position in which turned down flange member 150 abuts against the exterior of flange 118 of plate 116, and in which position bars 146 and 148 are aligned between bars 44 and 46 when the platform descends, so as to hold the platform in a second intermediate position, somewhat higher than when the platform is held by plate 116. To prevent upper sliding plate 142 from being removed and perhaps mislaid, lost or damaged, it is preferably retained in connection with plate 116 by means of tabs 156 and 158 punched upwardly out of plate 116 and bent toward each other to form a channel for receiving plate 142; when withdrawn to its maximum extent, the flange 160 of plate 142 abuts the inward end of tabs 156 and 158, to prevent removal of plate 142.

Figure 9:
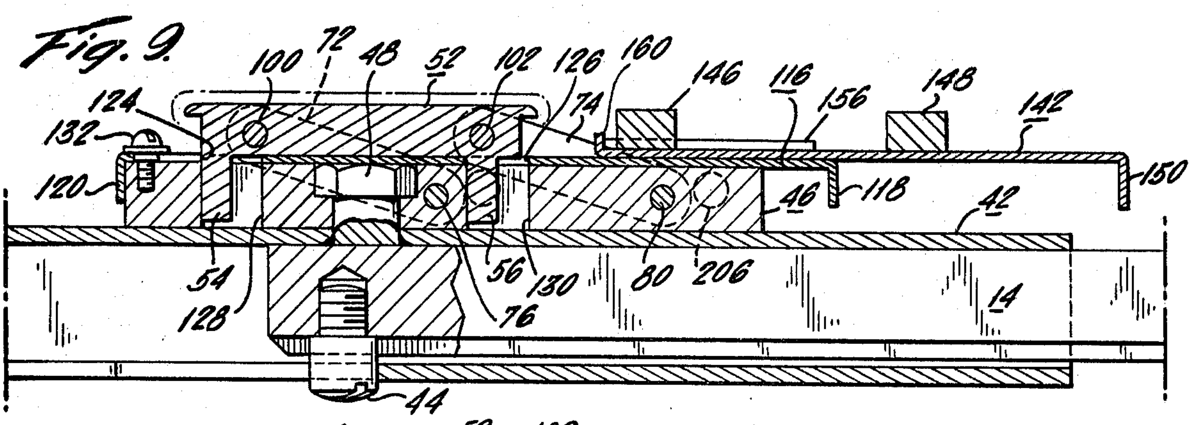
FIGS. 9, 10, 11 and 12 are corresponding sectional views of a lift-pad assembly according to the invention, showing how the platform thereof may be adjusted to each of four different vertical positions.
Figure 12:
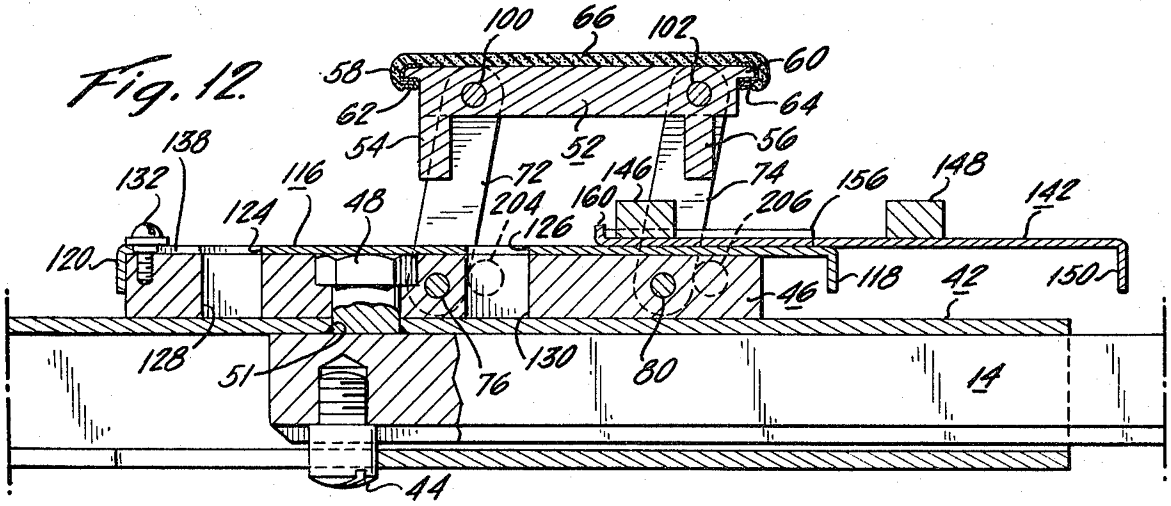

Turning now to FIGS. 9 and 12 which illustrate the platform in each of the four vertical positions provided by the present embodiment of the invention, FIG. 9 shows the position in which the platform 52 is in its lowest position, wherein the two bars 54 and 56 on the lower side thereof extend into the depressions 128 and 130 so that the underside of the platform not occupied by the bars rests against the sliding bottom plate 116, as shown. Under these conditions the sliding top plate 142 is fully retracted and does not affect the position of platform 52.

Figure 10:
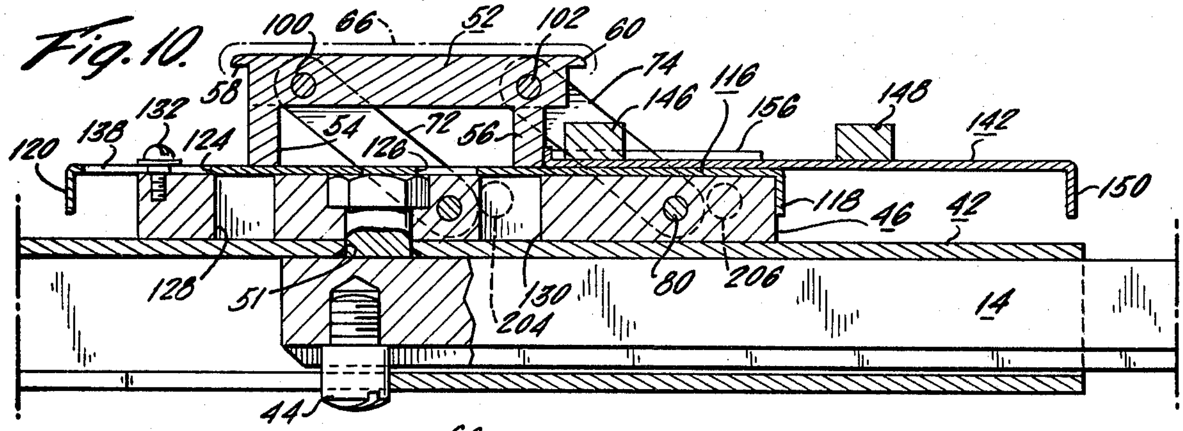

FIG. 10 shows the condition in which the bottom plate 116 has been slid to its most advanced position in which it covers the recesses or openings 128 and 130, so that when platform 52 is lowered, it rests against the upper surface of the lower plate 116 thus providing a first intermediate position for the platform between its lowest and highest positions.

Figure 11:
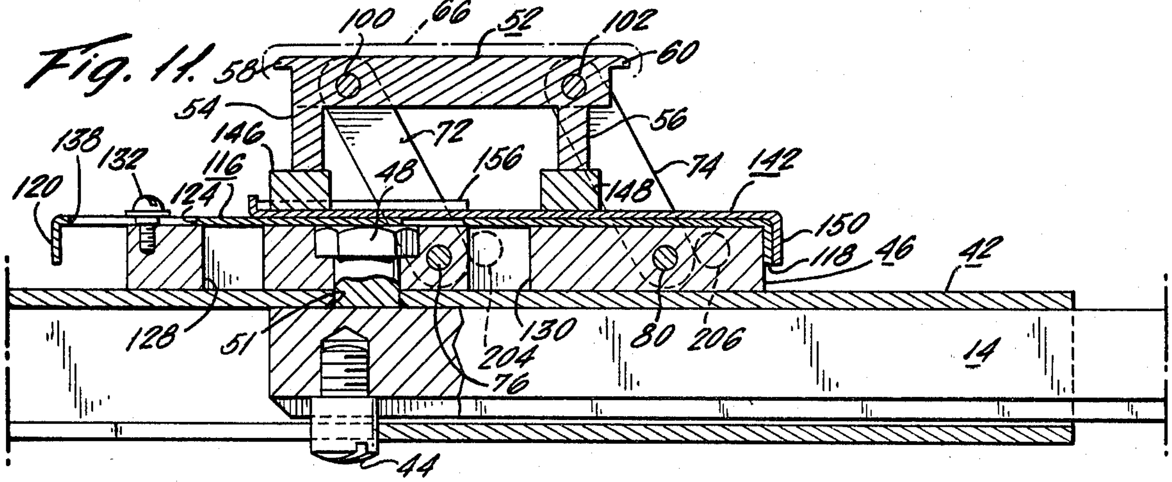

FIG. 11 shows the condition in which the top plate 142 has been slid fully forward on top of fully advanced plate 116, so that the bars 146, 148 on the top of plate 142 are aligned with the bars 54 and 56 on the underside of the platform, and thus support the platform in an intermediate position higher than that shown in FIG. 10 but lower than the maximum upward position shown in FIG. 12.

More particularly, in FIG. 12 the platform 52 is shown in its highest stable position. The platform has been swung up to its peak and slightly past or over center, so that the weight of the vehicle thereon tends to rotate the support linkages even further in the clockwise direction, which would permit the platform to fall again to a lower position; however, this motion is prevented by the stop members 200, 202, 204 and 206, positioned to act between the base member 46 and the support linkages to prevent the latter linkages from moving further clockwise than a position just beyond the vertical. A position of the linkages just beyond the vertical, rather than precisely vertical, is chosen so that if there should be some tendency for sideways motion of the platform, due to vibration or other sideways motion of the vehicle, the platform cannot collapse to its lower position and instead is positioned over-center against the above-mentioned stops.

Figure 7:
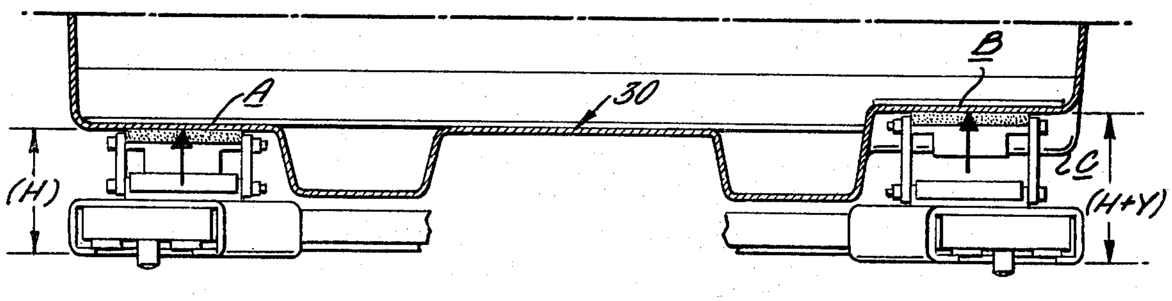
FIG. 7 is a view, partially in section, showing schematically a vehicle and two lift-pad assemblies according to the invention positioned as they may be utilized to support a vehicle.
Figures 3, 4, 5, 6:
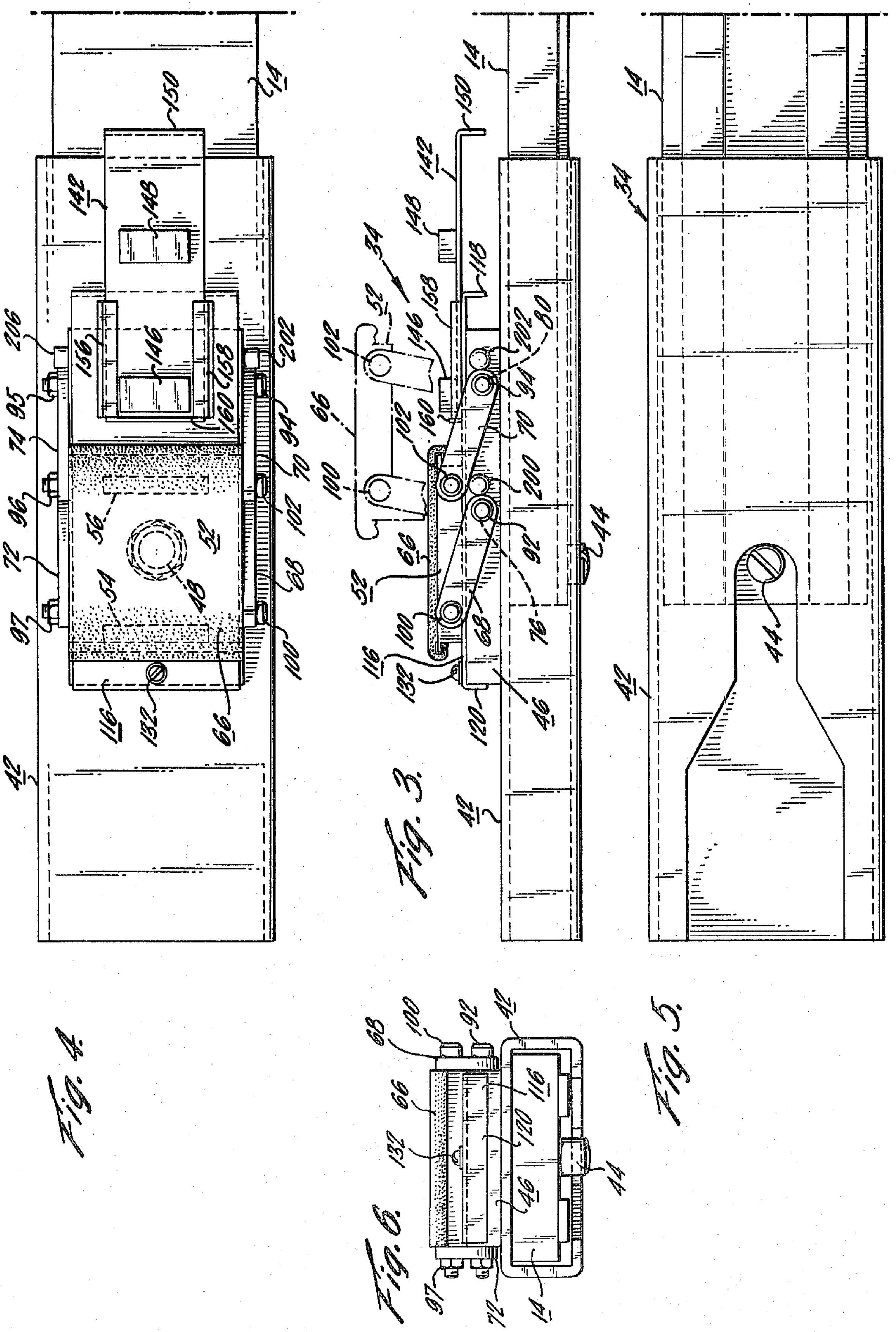
FIG. 3 is an enlarged fragmentary side view taken along line 3—3 of FIG. 1.
FIG. 4 is a top view of the apparatus as shown in FIG. 3.
FIG. 5 is a bottom view of the apparatus as shown in FIG. 3.
FIG. 6 is a end view of the apparatus as shown in FIG. 3, looking at it from its left hand end.

Thus, the platform can be held stably and strongly in any of the four vertical positions shown in FIGS. 9–12, with the platform horizontal in all cases. FIG. 7 illustrates schematically some situations in which this is of a value. Thus, there is represented schematically at 30 a bottom surface of a vehicle, viewed in the fore and aft direction. In this example it is assumed that the bottom of the vehicle is completely covered by an irregularly configured sheet of metal, so that one of its lift support surfaces at A is lower than another of its lift support surfaces represented at B. Furthermore, since in FIG. 7 it is assumed that the apparatus is viewed looking inwardly at the ends of two of the swing arms of the lift, the downwardly-extending bulge shown at C is between the axis of pivot of the swing arm at the right of the drawing and the lift surface at B, so that the swing arm must pass below the lower surface C and the lift-pad must be erectable nevertheless to provide the desired contact at B. At the left in FIG. 7 there is shown the adjustment of the lift-pad which provides a height for the top of the platform 52 which is at a distance H from the common plane of the lift arms, while at the right of FIG. 7 the top of the platform is at a greater height H+Y; the height H is achieved by the configuration of FIG. 11, while the height H+Y is achieved by the configuration of FIG. 12. In driving the vehicle into or away from the lift position, it is understood that the platform is folded to the lowermost position thereof shown in FIG. 9.

It will be understood that more or less than the four vertical positions for the platform may be provided, if desired, and that other arrangements of the bars and sliding plates may be employed to the same general purpose. Further, the bar-receiving recesses 128 and 130 in the base member 46 should be large enough to accommodate the circular motion of the bars 54 and 56, and may be rounded to bevelled on one side if desired.

While the invention has been described with particular reference to specific embodiments in the interest of complete definiteness, it will be understood that it may be embodied in a variety of forms diverse from those specifically shown and described, without departing from the spirit and scope of the invention as defined by the appended claims.

What is claimed is:

1. A lift-pad assembly for contacting and supporting a part of a vehicle on an arm of a vehicle lift, comprising:

a horizontal platform adated to engage and support said vehicle;

means mounting said platform on said arm in vertically adjustable relation to said arm while holding said platform horizontal in each of its adjusted positions;

said mounting means comprising a flat horizontal base member below said platform, a first and a second pivotable support linkage and a first set of four pivot means having mutually parallel pivot axes, two of said four pivot means pivotably securing a lower portion of said first and second support linkages to one portion of said base member, and two others of said four pivot means pivotally securing an upper portion of said first and second support linkages to one portion of said platform, said four pivot means being located so that a first line extending between and normal to the two pivot axes of one of said support linkages is parallel and equal in length to a second line extending between and normal to the two pivot axes of the other of said support linkages, whereby pivoting motion of said support linkages permits said platform to move sideways and vertically simultaneously, while holding said platform horizontal; and means for holding said platform in at least three different vertical positions;

wherein said holding means comprises bar means on the underside of said platform, bar-receiving means in the top of said base member for receiving said bar means when said platform is positioned to rest against said base member in its lowermost position, and means movable at will for covering said bar-receiving means to prevent entry of said bar means into said bar-receiving means to support said platform in a second position higher than said lowermost position.

2. The assembly of claim 1, wherein said means movable at will comprises a plate slideable along the top of said base member and having aperture means extending therethrough for permitting passage of said bar means through it, said plate being slideable between a first position in which said aperture means are aligned with said bar-receiving means to permit movement of said platform to said lowermost position, and a second position in which it covers said bar-receiving means and supports said bar means to hold said platform in said second position higher than said lowermost position.

3. The assembly of claim 2, comprising a pair of stop means on said slideable plate for arresting sliding motion of said plate in one direction at said first plate position and in the other direction at said second plate position.

4. A lift-pad assembly for contacting and supporting at least a part of a vehicle on an arm of a vehicle lift, comprising:

a sleeve slidably adjustable along a part of the length of said arm;

a base member pivotally mounted to said sleeve for pivoting motion about a vertical axis;

a platform horizontally mounted on and above said base member;

a first pair of support linkages extending between a first side edge of said platform and a first side edge of said base member; a first lower pair of pivots securing a lower portion of each of said first pair of support linkages to said first side edge of said base member; and a first upper pair of pibots securing an upper portion of each of said first pair of support linkages to said first side edge of said platform, the pivot axes of said first upper and lower pairs of pivots all being parallel to each other and horizontal, the distance between the two pivot axes of one of said first pair of support linkages being substantially the same as the distance between the two pivot axes of the other of said first pair of support linkages;

a second pair of support linkages extending between a second side edge of said platform, opposite from said first side edge thereof, and a second side edge of said base member opposite from said first side edge thereof; a second lower pair of pivots securing a lower portion of said second pair of support linkages to said second side edge of said base member; and a second pair of upper pivots securing an upper portion of each of said pair of support linkages to said second side edge of said platform, the pivot axes of said second pair of support linkages being parallel to each other and to those of said first pair of support linkages, the distance between the two pivot axes of one of said second pair of support linkages being substantially the same as the distance between the two pivot axes of the other of said second pair of linkages and the same as the distance between the pivot axes of said first support linkages;

at least two bar means secured to the underside of said platform and extending parallel to said pivot axes, said bar means protruding downwardly with respect to said platform;

recess means in said base member for receiving said bar means when said platform is pivotted downwardly in one rotational sense, to permit said platform to rest directly on said base member in a lowermost position thereof;

a plate on the top of said base member, slideable along a horizontal direction transverse to said pivot axes, and having apertures of a size, configuration and position to permit passage of said bar means therethrough when said plate is in a first position for which said apertures are vertically aligned with said recess means in said bar member, said plate being slideable to a second position in which said recess means are covered by said plate to prevent said bar means from moving into said recess means and for holding said platform in a higher position above said lowermost position; and first stop means acting between said linkages and said base member for holding said linkages substantially at the positions which they occupy when said platform is at its highest position, such that a line through the upper and lower pivots of each linkage extends substantially vertical.

5. The assembly of claim 4, comprising additional plate means and additional bar means on said additional plate means, said additional bar means being interposable between said base member and said at least two bar means, by sliding of said additional plate means, to hold said platform above said higher position.

* * * * *